United States Patent [19]

Fovenyessy

[11] Patent Number: 4,614,054

[45] Date of Patent: Sep. 30, 1986

[54] FISH HOOK PROTECTIVE COVER

[76] Inventor: Otto K. Fovenyessy, 2693 Eaton Ave., San Carlos, Calif. 94070

[21] Appl. No.: 725,905

[22] Filed: Apr. 22, 1985

[51] Int. Cl.[4] ............................................. A01K 83/00
[52] U.S. Cl. ...................................................... 43/43.2
[58] Field of Search ..................... 43/43.2, 43.4, 43.6, 43/44.82

[56] References Cited

U.S. PATENT DOCUMENTS

| D. 167,803 | 9/1952 | Miller . | |
| 867,439 | 10/1907 | Staehle . | |
| 1,255,516 | 2/1918 | Daller . | |
| 2,204,185 | 6/1940 | Lougheed | 43/39 |
| 2,616,209 | 11/1952 | Ploen | 43/54.1 |
| 2,703,467 | 3/1955 | Shepherd | 43/54.1 |

FOREIGN PATENT DOCUMENTS

| 1491507 | 8/1967 | France | 43/43.2 |
| 2481576 | 11/1981 | France | 43/43.2 |
| 277551 | 9/1951 | Switzerland | 43/43.2 |

Primary Examiner—Gene P. Crosby
Attorney, Agent, or Firm—Flehr, Hohbach, Test, Albritton & Herbert

[57] ABSTRACT

A sheath-type of article made of plastic for receiving and covering a plural-barb fish hook includes individual pockets independently removable from an associated fish hook barb.

1 Claim, 5 Drawing Figures

U.S. Patent  Sep. 30, 1986  4,614,054
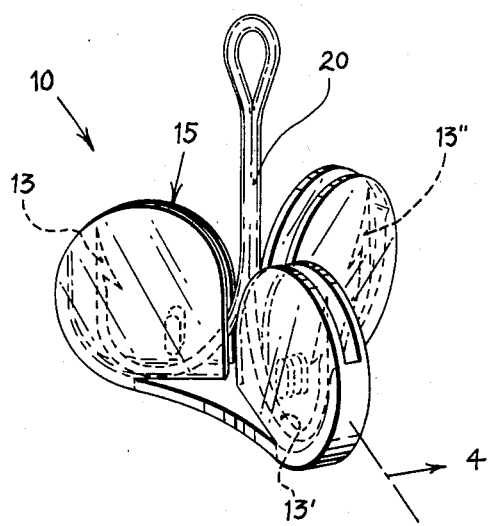
FIG_1
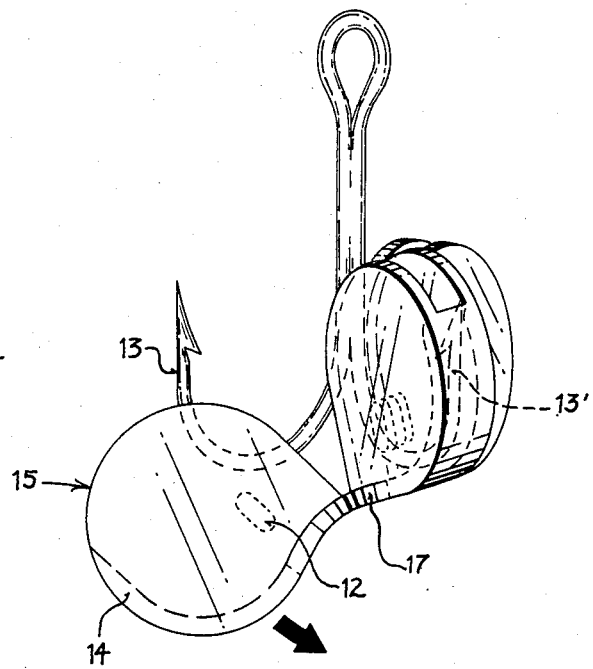
FIG_2
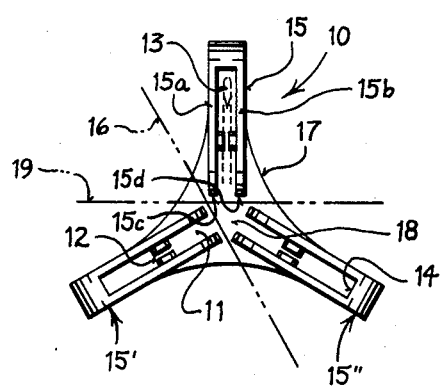
FIG_3
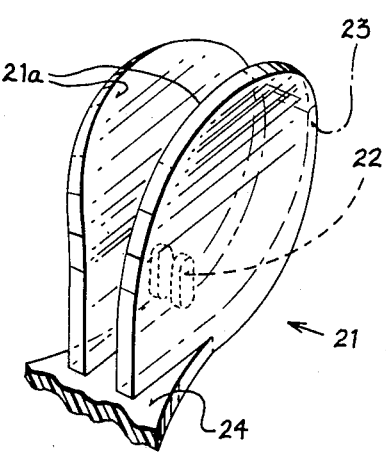
FIG_5
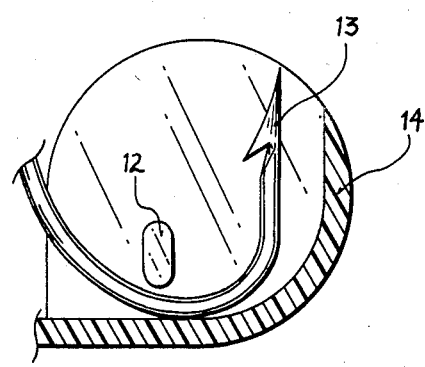
FIG_4

FISH HOOK PROTECTIVE COVER

In general this invention pertains to a sheath article for protectively covering each of a plurality of barbed hooks of a plural-barbed fish hook. More particularly this invention is particularly useful in permitting fish hooks to be safely carried in a person's pocket or preventing their entanglement with others when carried in a bait box.

BACKGROUND OF THE INVENTION

Covers for fish hooks have previously been provided for plural-barbed fish hooks but previously have required that the cover be removed from all barbed hooks simultaneously. While the protective article disclosed herein can also be removed from all barbed hooks simultaneously, there has been a need for a protective fish hook cover of a type wherein a plurality of sheaths or pocket portions cover their respective barbed hook portions in a manner whereby the various pockets can be removed successively.

SUMMARY OF THE INVENTION AND OBJECTS

A protective fish hook cover for receiving and covering plural-barbed hook portions of a fish hook includes a plurality of protective pockets. A flexible plastic web or base supports the plurality of pockets thereon in a manner permitting each pocket to pivot downwardly and away from the others to expose one barbed hooked portion at a time. Each pocket includes confronting side walls having radially inner, upper and outer edges. The radially inner edges of the pockets lie spaced from each other to define an open region extending downwardly to the web for readily receiving the shank portion of a plural-barbed fish hook therein.

In general it is an object of the present invention to provide an improved protective fish hook cover or sheath article.

It is another object of the invention to provide such a protective fish hook cover or sheath article in a manner whereby each pocket flexes independently of the other pockets.

Yet a further object of the invention is to provide such a sheath article having a plurality of pockets arranged to include a central opening therebetween for receiving the shank portion of the fish hook. Yet an additional object of the invention is to provide a semi-rigid edge to each pocket to form a gripping portion thereon.

The foregoing and other objects of the invention will be more readily evident from the following detailed description of preferred embodiments when considered in conjunction with the drawings.

BRIEF DESCRIPTION OF THE DRAWINGS

FIG. 1 shows a diagrammatic perspective view of a fish hook protective cover or sheath article, according to the invention;

FIG. 2 shows a diagrammatic perspective view of the invention of FIG. 1 wherein one of the plural pockets has been flexed downwardly and essentially removed from its associated hook portion;

FIG. 3 shows a diagrammatic plan view of the invention shown in FIG. 1;

FIG. 4 shows an elevation section view in enlarged detail taken through a mid-plane of one of the pockets as indicated by the line 4—4 of FIG. 1; and FIG. 5 shows an enlarged diagrammatic perspective detail view of the manner of forming the pockets of the article according to another embodiment of the invention.

DETAILED DESCRIPTION OF PREFERRED EMBODIMENTS

A protective sheath article 10 for covering each of a plurality of barbed hooks 13, 13', 13" includes a base or web portion 17 of flexible plastic material for supporting a plurality of pockets 15, 15', 15". Inasmuch as the pockets are identical to each other, a description of pocket 15 is believed appropriate. Accordingly, pocket 15 includes a pair of spaced confronting side walls 15a, 15b carried to extend upwardly from web 17 and disposed radially from an open region 18 of web 17.

The radially inner edges 15c, 15d of the pockets 15, 15', 15" are spaced from the radially inner end edges of the other pockets whereby each pocket can pivot downwardly independently of any other pocket as they are individually removed from their associated barbed hook 13, 13', 13".

Accordingly, as shown in FIG. 2 the flexibility of web 17 in conjunction with the independent mounting of each of the pockets permits pocket 15 to be pivoted downwardly to expose hook 13.

Each pocket includes a pair of confronting separable buttons 12 disposed normally to lie above the hook portion 13 when inserted into the pocket but capable of being separated to permit the hook to be removed or inserted.

After a given pocket, such as pocket 15, has been pivoted downwardly as shown in FIG. 2 to expose hook 13, buttons 12 serve to retain pocket 15 in its open position unless the pocket is forced over the hook.

Each of the pockets includes a semi-rigid radially outer edge 14. Accordingly, semi-rigid means such as a portion of the plastic material extends between and serves to join the radially outer confronting edge margins of each pocket to provide a semi-rigid radially outer portion adapted to be gripped by a fisherman. Thus the fact that the radially outer end wall 14 has been formed of semi-rigid material makes it easier for a person to grip each individual pocket for movement downwardly. In addition the presence of the semi-rigid material in the radially outer end wall of each pocket serves to maintain the fisherman's thumb and forefingers spaced away from the plane of the hook 13 associated therewith.

Accordingly a plural-barb fish hook protected by the sheath article 10 can be removed by bending or pivoting pocket 15 downwardly about the "hinge" line 19 to the point shown in FIG. 2. Then, in succession pocket 15' can be pivoted downwardly about its associated "hinge" line 16 defined across web 17. The third pocket can be readily removed after the first two pockets have been released.

Another embodiment of the invention includes substantially the structure described above and shown in the drawings but with the provision of an improved pocket 21. Pocket 21 is characterized by the fact that the confronting surfaces of the upper edge margins 21a of pockets 21 diverge progressively upwardly to enlarge the open upper end of the pocket. By enlarging the open upper end of pocket 21, it becomes somewhat easier for a fisherman to replace the sheath article 10 onto a plural-barb fish hook.

A sheath article according to the last-named embodiment characterized by the pockets 21 includes the retaining buttons 22 as well as the reinforced radially outer end walls 23. Web 24 corresponds to web 17 described above.

From the foregoing it will be readily evident that there has been provided an improved protective fish hook cover particularly useful with respect to application on plural-barb fish hooks wherein each protective portion can be removed separately from the others.

While the separate removal of each pocket from its associated barb represents a substantial advantage in safety as well as in convenience, the entire sheath article 10 can be removed by grasping the edges of web 17 and applying a sharp jerk to the hook or to the sheath article.

Leaving the center 18 fully unobstructed down to web 17 permits the shank 20 and all of its associated hooks 13, 13', 13" to be readily fully inserted into their associated pockets.

I claim:

1. A sheath article for covering each of a plurality of barbed hook portions of a plural-barbed fish hook comprising a flexible base, a plurality of protective pockets each being formed to include a pair of spaced confronting side walls disposed upon said base in a manner whereby said base forms the bottom of each pocket, the top of each pocket being open and unobstructed from above for permitting the hook portions to be axially inserted and withdrawn respectively into and out of associated pockets either simultaneously or separately, said pockets being arranged radially of each other and spaced from and independent of each other to permit each pocket and its underlying base portion to flex and move away from its associated hook portion independently of the other pockets for removing said hook portions separately.

* * * * *